United States Patent [19]

Simonov et al.

[11] Patent Number: 5,427,312
[45] Date of Patent: Jun. 27, 1995

[54] THERMOSTATIC MIXING VALVE AND METHOD OF USE THEREOF

[76] Inventors: Alexander Simonov, 30045 Northgate Dr., Southfield, Mich. 48076; Sergei Menchenin, 26130 Twelve Mile Rd., #220, Southfield, Mich. 48034; Solomon Lyakhovskiy, 25875 Greenfield Rd. #27, Southfield, Mich. 48075; Aron Rozenberg, 15075 Lincoln Rd., Apt. 631, Oak Park, Mich. 48237

[21] Appl. No.: 181,673
[22] Filed: Jan. 14, 1994
[51] Int. Cl.[6] .......................................... G05D 23/185
[52] U.S. Cl. ................................ 236/12.11; 137/88; 251/25
[58] Field of Search ................. 236/12.11, 80 G, 80 B; 137/88; 251/25

[56] References Cited

U.S. PATENT DOCUMENTS

| | | | |
|---|---|---|---|
| 1,819,045 | 8/1931 | Snediker | 236/12.11 |
| 2,170,307 | 8/1939 | Ohme et al. | 137/595 X |
| 2,415,994 | 2/1947 | Curtis | 236/12.11 |
| 2,449,766 | 9/1948 | Brown | 236/12.11 |
| 3,352,489 | 11/1967 | Coulombe et al. | 236/12.11 |
| 4,700,884 | 10/1987 | Barrett et al. | 236/12.12 |
| 5,011,074 | 4/1991 | Kline | 236/12.13 |
| 5,108,032 | 4/1992 | Stewart | 236/12.17 |
| 5,110,044 | 5/1992 | Bergmann | 236/12.16 |
| 5,148,976 | 9/1992 | Reid | 236/12.2 |
| 5,161,737 | 11/1992 | Olmsted | 236/12.21 |
| 5,174,495 | 12/1992 | Eichholz et al. | 236/12.12 |
| 5,203,496 | 4/1993 | Kline | 236/12.7 |
| 5,205,483 | 4/1993 | Kostorz | 236/12.2 |

Primary Examiner—William E. Wayner
Attorney, Agent, or Firm—Weintraub Duross & Brady

[57] ABSTRACT

A thermostatic mixing valve and method of use thereof. The thermostatic mixing valve is controlled by the incoming hot and cold fluids, which are mixed in a mixing chamber, by a thermally responsive element disposed in the flow of the fluid mixture in a fluid outlet from the mixing chamber. A distributor for distributing the flow is controlled by the thermally responsive element. A drive is activated by pressure of the fluid and is connected to the distributor for controlling the position of the drive. The distributor is used to control the hot and cold fluid flows. Channels are provided to connect the distributor with one of the fluid inlets, to connect the distributor with the outside of the valve body to conduct away used operating fluid and to connect the distributor with the drive.

16 Claims, 4 Drawing Sheets

THERMOSTATIC MIXING VALVE AND METHOD OF USE THEREOF

BACKGROUND OF THE INVENTION

I. Field of The Invention

The present invention relates in general to thermo-regulators and, in particular, to thermostatic mixing valves for adjustable mixing of fluids.

II. Description of The Relevant Art

As is known to those skilled in the art to which the present invention pertains, there are devices, commonly called faucets, which are mixing valves for mixing hot and cold water in bathroom, kitchen and other facilities. Such devices usually comprise a cold water inlet, a hot water inlet, a mixing chamber and one or more valves to control water flow into the chamber.

The purpose of such mixing valves is to maintain both stable temperature and flow of the outcoming water. The process of manual temperature adjustment takes several seconds, even for a well-designed mixing valve if the temperatures and the pressures in the pipelines to both the cold and hot water inlets are stable, it is possible to adjust water temperature to a desired value after several attempts. The temperature of the outcoming water will stay stable while both the pressure and the temperature of the water in both the hot and cold inlets do not change. Frequently, however, the pressure and the temperature of the water in the inlets change depending on the load on the pipelines and a number of other conditions. Thus, a simple mixing faucet does not provide temperature stability for the outcoming water.

There are a number of technical solutions which can improve stabilization of the temperature of the outcoming water. One example is the thermostatic mixing valve which somewhat ameliorates the problem. In a thermostatic mixing valve, such as is shown in U.S. Pat. Nos. 5,108,032, 5,110,044 and 5,203,496, the relatively hot and cold fluid flows are controlled by a valve which is set by a thermally responsive element. If there is a drop in the cold water pressure, this will result in a temperature increase of the mixed fluid which will, accordingly, expand the thermally responsive element. Consequently, altering the setting of the valve decreases the hot fluid flow and increases the cold fluid flow, while still at reduced pressure, that enters the valve. Eventually, equilibrium conditions will exist with the thermal element at its new expanded condition and the valve settings. However, the new expanded condition of the thermal element corresponds with the new temperature variations but cannot provide stable temperature.

In order to improve system performance, some mixing valves (U.S. Pat. No. 5,1810,737) are designed to equalize pressures in both inlets and then stabilize the temperature. However, besides the design of such pressure equalizing valves being complicated, they are still affected by any temperature changes of the incoming fluids in the inlets. Consequently, these pressure equalizing valves cannot maintain a stable temperature.

It is thus, seen that none of the devices described above has the capability to set the temperature of the mixed water to a pre-defined known value.

Another approach to temperature control is to employ the use of a degenerative feedback device. Such a device, usually, comprises: (1) a hot water inlet, (2) a cold water inlet, (3) a mixing chamber, (4) a valve controlled by a stepper or other motor, (5) a temperature sensor, (6) an electric unit for comparing a signal from the temperature sensor with a reference signal, and (7) a motor control for making the difference in the signals as low as possible. Such devices have sophisticated electronics, often including both a microprocessor and an electrical power supply. However, the devices require safety protection against the potential of electrical shock. Also, these devices need protection against the occurrence of power loss, in order to avoid the possibility of the temperature of the mixed water running out of control. For these reasons, these devices are expensive and inapplicable in a household.

It is to be appreciated that no known device is capable of setting and maintaining the desired temperature of the fluid with low temperature fluctuations and based on an inexpensive design.

SUMMARY OF THE INVENTION

The principal object of this invention is to provide a thermostatic mixing valve, which meets the following criteria:

1. Provide a full range of graduated temperature control that is independent of the flow rates and temperatures of the fluids in the inlets;
2. Allow the temperature to be preset, with a known value:
3. Use no electricity and be of a simple, inexpensive construction;
4. Be installable in place of a regular mixing valve using only normal plumbing skills;
5. Be safe in case of loss of pressure in one of the incoming fluids, and be capable of automatically cutting off the other incoming fluid; and
6. Provide a stable and precise temperature (between the temperatures of the cold and the hot liquids) of blended fluid within the wide ranges of changes in both the pressures and the temperatures of the cold and hot fluids.

According to the present invention, there is provided a thermostatic mixing valve comprising:

a valve body;

first and second inlets to the valve body for fluid flow for relatively hot and cold fluids, respectively;

a valve for controlling the fluid flow through the fluid inlets;

a mixing chamber:

an outcoming ducting for the mixed fluid;

a fluid-operated drive, the drive being connected to the valve for controlling the position thereof and having a chamber formed therein;

means for distributing the mixed fluid;

a thermally responsive element, located in the outcoming fluid ducting, past the mixing chamber;

means for connecting the means for distributing with the drive;

means for connecting one of fluid inlets with the means for distributing;

means for connecting the means for distributing with the outside of the valve body to remove the mixed fluid; and means for connecting the means for distributing with the drive.

Additionally, a handle can be connected to the thermally responsive element and a scale can be located on the handle so that the handle can be pointed to a selected degree of temperature on the scale.

The means for distributing directs part of the incoming (cold or hot) fluid into the drive and to one of a plurality or through a system or labyrinth of channels within the valve body. When the temperature of the outcoming fluid has a desired value, all the channels are locked by the distributor, so that fluid is not directed to the drive, and its piston is fixed in position. Hence, the valve cannot move and the incoming fluids are mixed in any desired constant ratio.

When the temperature of the mixed fluid shifts from the desired value the thermally expandable element, which can be a bimetallic coil, moves the means for distributing to connect the chamber of the drive with the channel, thereby providing incoming fluid. The incoming fluid flows into the drive, and pushes against the piston. At the same time the fluid from the outer chamber of the drive is being pushed outside the valve body through another channel and the means for distributing. In response to the fluid, the piston starts to move, and the valve, which is connected with the piston, adjusts the temperature of the outcoming fluid by changing the ratio between the cold and hot fluid flows.

The chamber of the drive into which the liquid is directed, is chosen, so that the piston is driven in the direction that the valve adjusts the temperature to the desired value. Thus, the temperature of the mixed fluid changes, and the thermally responsive element moves the means for distributing, according. When the temperature reaches the desired value, the means for distributing locks all the channels, and the piston stops in the new position. In this way, the pressure of the incoming fluid is used as an energy source for regulation. There is no mechanical connection between the thermally responsive element and the valve. The temperature of the mixed fluid can be adjusted precisely within the limits of the sensitivity of the thermally responsive element.

The present invention will be more clearly understood upon reference to the following detailed description when read in conjunction with the accompanying drawings, and in which:

DETAILED DESCRIPTION OF THE PREFERRED EMBODIMENT

For the purposes of promoting an understanding of the principles of invention, reference first will be made to the simplified schematic diagram, illustrated at FIGS. 1 and 5.

Figure 1:
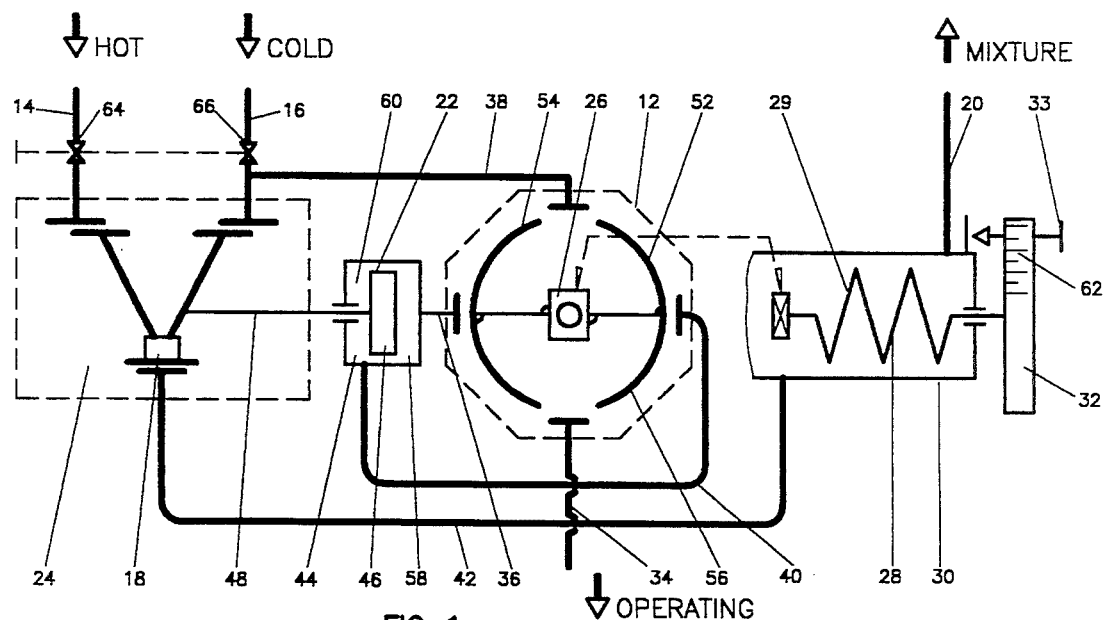
FIG. 1 is a schematic diagram of a thermostatic mixing valve in accordance with the present invention.

Now referring to FIG. 1, the basic elements of the thermostatic mixing valve hereof, denoted as at 10, includes a valve body 12, a hot fluid inlet 14, a cold fluid inlet 16, a mixing chamber 18, a blended fluid outlet 20, a fluid-operated drive 22, a sliding piston valve 24, means for distributing 26, a thermally responsive element 28 disposed in a chamber 30, a handle 32 and a system or labyrinth of internal channels 34, 38, 40 and 42.

The drive 22 comprises a cylinder 44 and a piston 46. A piston rod 48 extends from the piston 46 and engages with the sliding piston valve 24. The drive 22 is operable by any fluid flowing through the device, such as, air, liquids, oil, etc. But, preferably, the operation of the drive 22 is directed to the use of water as the operating fluid and in the preferred embodiment hereof is a water-operated drive.

The sliding piston valve 24 includes the mixing chamber 18, in which incoming fluids of different temperatures are merged and mixed therein and throughout the following flow. The openings of the mixing chamber 18 are coupled to the inlets 14 and 16 for conducting and adjusting the amounts of both the cold and hot fluids entering the sliding piston valve 24.

Figure 7:
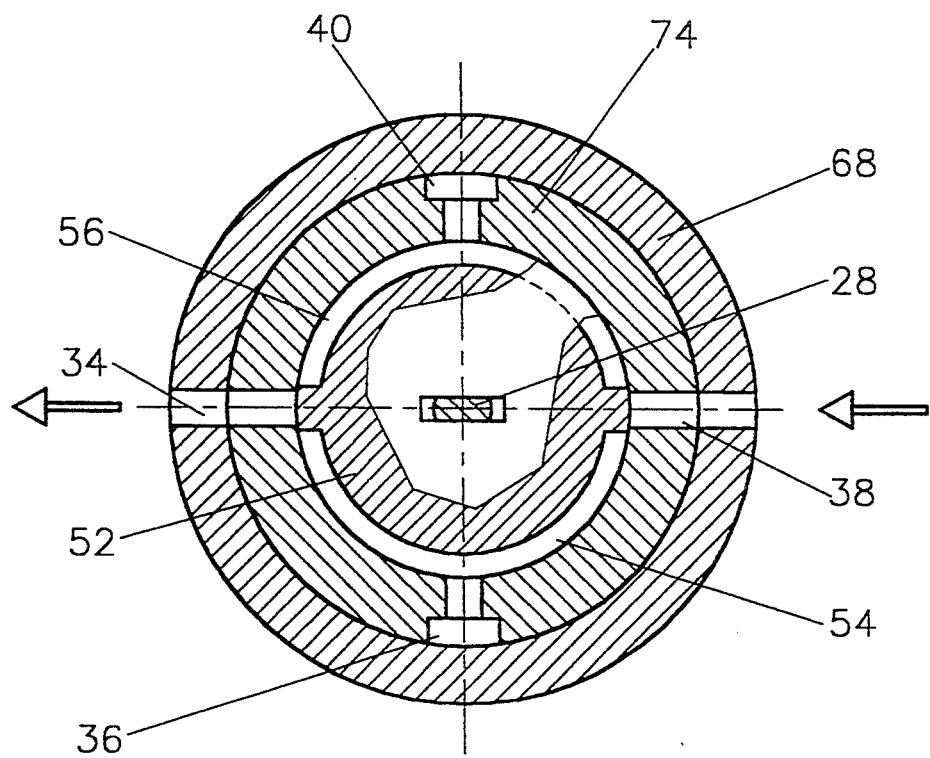
FIG. 7 is a cross-sectional view of the distributor assembly in the neutral position taken along line B—B of FIG. 5.
Figure 8:
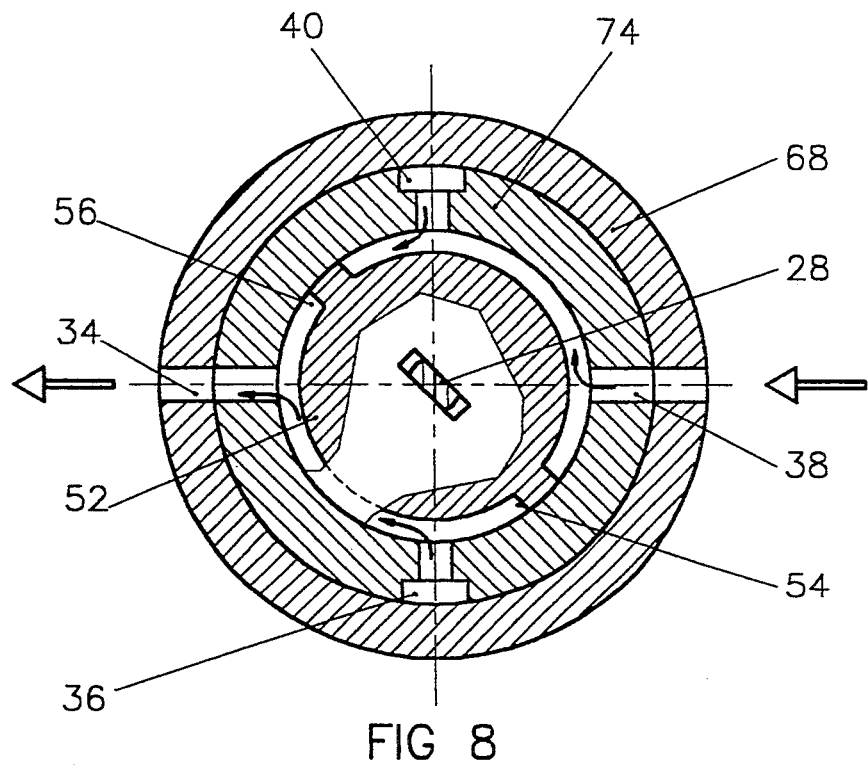
FIG. 8 is a cross-sectional view of the distributor assembly, taken along line B—B of FIG. 5, when the temperature of the blended fluid is higher than the temperature set on the scale.

The means for distributing or distributor 26 comprises a distributor disk 52 having segment channels 54 and 56 which can turn inside the inner cylinder 74. The thermally responsive element 28 in the chamber 30 is used to control the distributor disk 52. In the neutral position, as depicted in FIG. 7, the distributor disk 52 locks both channel 34 and the input control channel 38 so that any fluid in channels 36 and 40 and, hence, in chambers 58 and 60 is also locked. If the distributor disk 52 is turned clockwise, as shown in FIG. 8, the segment channel 54 connects with the channel 36 and, thus, chamber 58 connects with channel 34, while segment channel 56 connects channel 40 and, as a result, chamber 60 of the drive 22 connects and is in fluid communication with the input control channel 38. The other end of the input control channel 38 is connected to the cold fluid inlet 16. The fluid from the cold fluid inlet 16 flows into the chamber 60. The fluid from the chamber 58 being pushed by the sliding piston valve 24, flows outside through the channel 36, through the segment channel 54 of the distributor disk 52 and then through channel 34.

Figure 9:
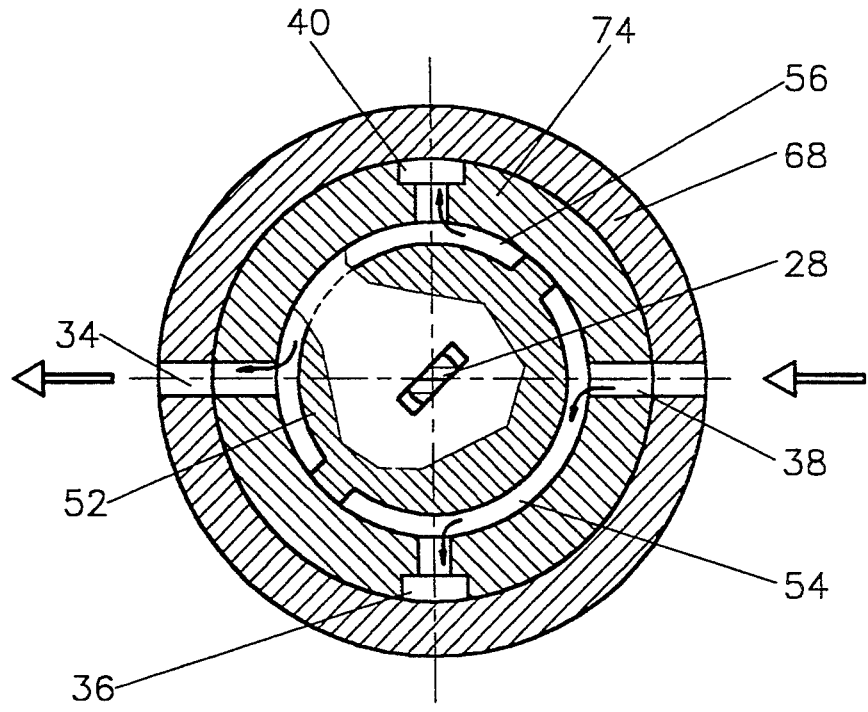
FIG. 9 is a cross-sectional view of the distributor assembly taken along line B—B of FIG. 5, when the temperature of the blended fluid is lower than the temperature set on the scale.

Now referring to FIG. 9, the distributor disk 52 is thereshown as turned so that segment channel 54 connects the input control channel 38 to channel 36 while segment channel 56 connects channel 40 to channel 34.

The mixed fluid from the mixing chamber 18 then passes through one of the segment channels, through the blended fluid channel 42 and is sequentially conducted to the chamber 30 containing the thermally responsive element 28, and then to the outlet 20. The operating or input control channel 38 conducts the fluid from one of the inlets (for example, from the cold fluid inlet 16), to the entrance of the distributor 26. The channel 34 conducts the fluid from the distributor 26 to the outside of the valve body 12. The channel 36 connects the segment channel 54 of the distributor 26 with a chamber 58 of the hydraulic drive 22. The channel 40 connects segment channel 56 of the distributor 26 with a chamber 60 of the hydraulic drive 22. The thermally responsive element 28 engages the distributor disk 52 from one side. From the other side, the thermally responsive element 28 engages the handle 32. Additionally, a scale 62 calibrated in degrees is provided on the handle 32.

The thermally responsive element 28 comprises a bimetallic coil 29, one end of which engages the distributor disk 52 and the other end of which is attached to the handle 32. The bimetallic coil 29 twists in reaction to the temperature of the mixed fluid in the chamber 30. The angle of twisting of the bimetallic coil 29 is defined by the equation $A = AO + (T-TO)*C$, where A is the final angle of twisting, AO is the angle of twisting of the bimetallic coil 29 at the temperature TO, T is the temperature of the surrounding fluid, and C is the coefficient of thermal twisting. The turn angle of the distributor disk 52 is $AD = A - AH$ where A is the above final angle of twisting of the bimetallic coil 29, and AH is the turn angle of the handle 32. Hence, for any angle of twisting of the bimetallic coil 29 and, thus, for any temperature, there is a corresponding turn angle of the handle 32 which puts the distributor disk 52 into neutral position. This makes it possible to set a desired temperature beforehand simply by turning the handle 32 to a certain position. The scale 62, therefore, displays degrees of Fahrenheit or Centigrade temperatures on the handle 32 and the scale 62 is used to direct the handle 32 into the desired position. A locking detent 33 on the handle 32 maintains the handle 32 in position and consequently maintains the indication of the temperature scale 62 and the desired position.

A pair of valves 64 and 66, one for each inlet 14 and 16 control the fluid flow in both inlets. The valves 64 and 66 affect the flow rate by impeding the flow of fluid into the thermostatic mixing valve 10. It is useful to combine the control handles of those valves 64 and 66 in one handle 32, so they are opened and closed simultaneously.

Figure 5:
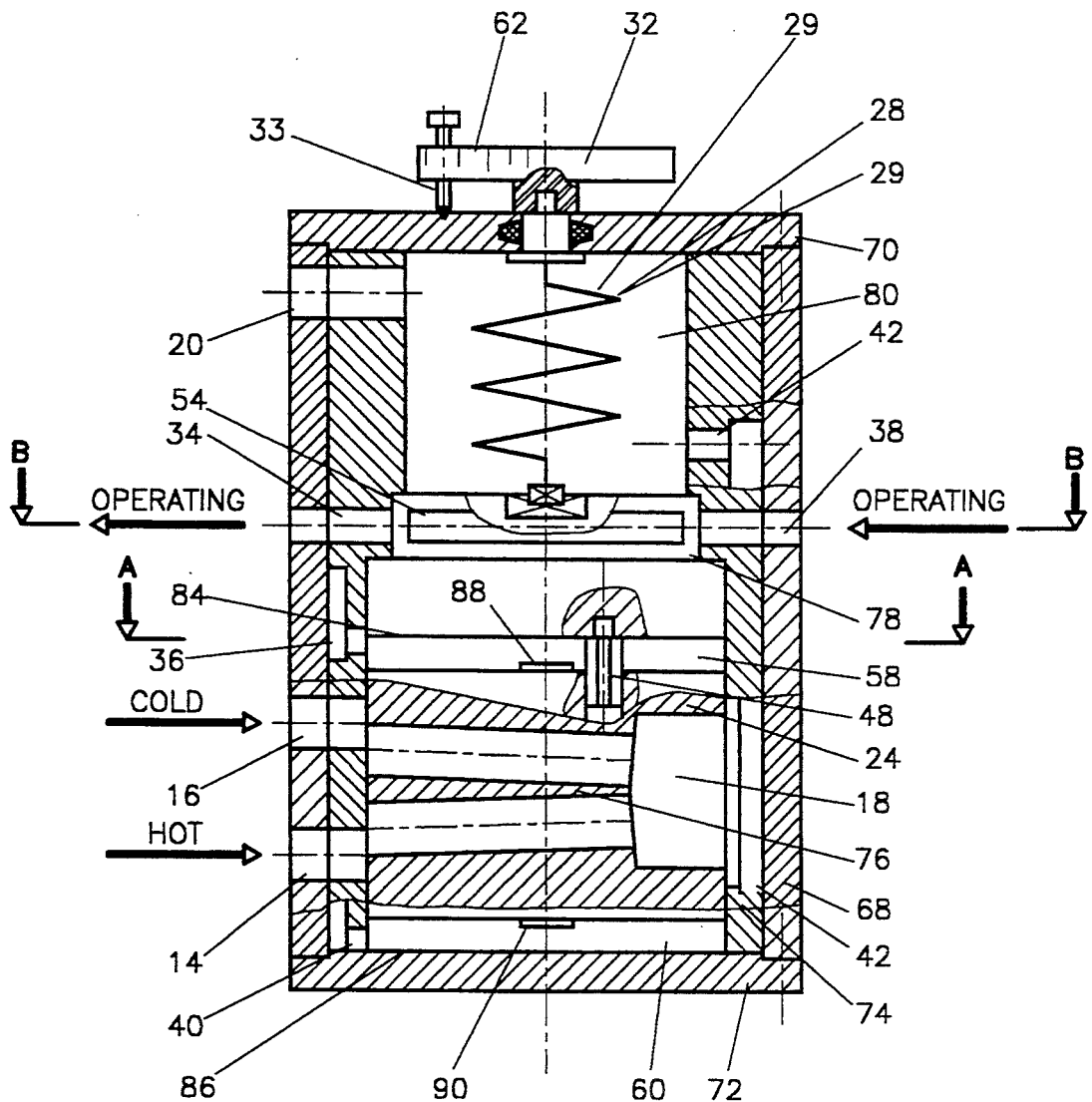
FIG. 5 is a cross-sectional view showing the construction of the regulator or the current invention.

As is best seen in FIG. 5, the valve body 12 defines an outer cylinder 68 open at both ends which ends are each sealed with two lids 70 and 72 respectively to close off the mixing chamber 18 and the sliding piston valve 24. An inner cylinder 74 is located inside the outer cylinder 68. The control channels 36, 38 and the blended fluid channel 42 are defined on the outer surface of the inner cylinder 74. The hot fluid inlet 14, the cold fluid inlet 16, the blended fluid outlet 20 and internal channels 34 and 38 are routed through the cylinder walls of both the cylinders 68 and 74. The inner cylinder 74 has three sections: a piston valve section 76, a distributor section 78 and a thermal element chamber 80.

It is to be noted that, and as shown in FIG. 1, the piston valve section 76 defines both the drive 22 and the sliding piston valve 24. The piston valve section 76 includes the sliding piston valve 24 and a stem 48, for preventing the sliding piston valve 24 against spinning. Butt-ends 84 and 86 are located at opposite ends of the piston valve section 76. The two chambers 58 and 50 are located between the sliding piston valve 24 and the butt-ends 84, 86 of the piston valve section 76. Hence, the sliding piston valve 24 slides axially inside the inner cylinder 74, but the distance of sliding is limited by the butt-ends 84, 86.

Inserts 88 and 90 on the sliding piston valve 24 provide a space for movement of liquid into the chambers 58, 60 when the sliding piston valve 24 is located at the end of its stroke near the butt-ends 84 and 86. The inserts 88 and 90 prevent the sliding piston valve 24 from fully engaging the butt-ends 84 and 86 thereby preventing a suction effect of the sliding piston valve 24 against the butt-ends 84 and 86. The inserts 88 and 90 also provide space for release of any air remaining in the chambers 58, 60. The mixing chamber 18 is located inside the sliding piston valve 24, in the diametrical section of the sliding piston valve 24. The channel 42 connects with the mixing chamber 18. The hot fluid inlet 14 and the cold fluid inlet 16 conduct hot and cold fluids respectively to the mixing chamber 18, so that the mixing ratio of the hot and cold fluids depend on the location of the sliding piston valve 24 inside the cylinder 74.

Figure 6:
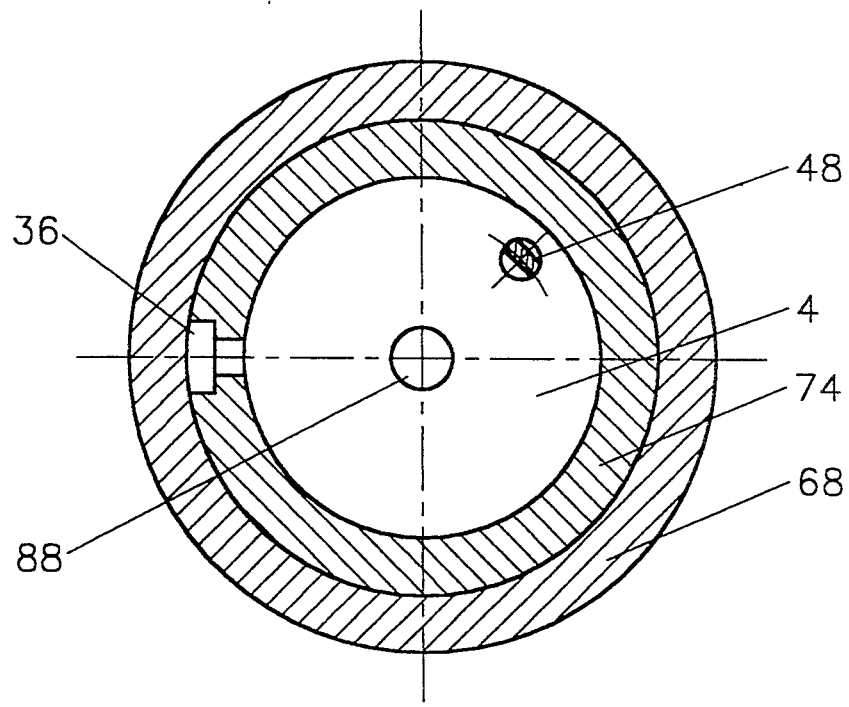
FIG. 6 is a cross-sectional view taken along line A—A of FIG. 5.

Referring now to FIG. 6, the channel 36 connects the chamber 58 (not shown) with the segment channel 56 of the distributor 26 while the channel 40 connects the chamber 60 with the segment channel 56 of the distributor 26.

Operation

When the temperature of the blended fluid is equal to the desired temperature, the disk 52 of the distributor 26 is turned so that segment channels 54 and 56 are not in registry or fluid communication with the channels 34 and 38 (FIG. 7). Any liquids contained in chambers 88 and 60 (FIG. 5) are locked in place because the sliding piston valve 24 is restrained from moving and the fluids from inlets 14 and 16 are mixed in the constant ratio. If either the pressure or the temperature in one or both of the inlets 14 and 16 change, the temperature of the blended fluid suitably changes.

For example, in a first case, assume the pressure or temperature in the hot fluid inlet 14 increases. Thusly, the temperature of the blended fluid also rises and the thermally responsive element 28 rotates the distributor disk 52 clockwise. Correspondingly, as the distributor disk 52 rotates, (FIG. 8) the segment channel 56 connects the input control channel 38 with the channel 40, and the segment channel 14 also connects the channel 36 with the channel 34. The fluid, being driven by the pressure in the cold fluid inlet 16, flows through the input control channel 38, from there into the segment channel 58, and then into the channel 40, and further flows to the chamber 60 of the drive 22, and pushes against the sliding piston valve 24. The fluid from chamber 58, being driven by the sliding piston valve 24 flows through the channel 36, thereafter, through the segment channel 54 and, further, through the channel 34 and subsequently flows outside of the valve body 12. Thus, the sliding piston valve 24 moves to the right, closing the hot fluid inlet 14, and simultaneously opens the cold fluid inlet 16. Hence, the temperature of the blended fluid decreases. The thermally responsive element 28, following the temperature of the mixed fluid, turns the distributor disk 52 clockwise, until it closes channels 34 and 38 in the neutral position (FIG. 7). As a result, the process is finished.

In the case of the pressure or the temperature falling in the incoming hot fluid, the temperature of the blended fluid also falls, and the thermally responsive element 28 rotates the distributor disk 52 counterclockwise (FIG. 9). The fluid from the cold fluid inlet 16 flows into the chamber 58 through the input control channel 38, segment channel 54 and then through channel 36 and by pushing acts upon the sliding piston valve 24. Any fluid contained in the other chamber 60 is pushed by the sliding piston valve 24, and consecutively flows outside of the valve body 12 through channel 40, segment channel 56 and channel 34. Thus, the sliding piston valve 24 moves to the left, closing the cold fluid inlet 16, and simultaneously opening the hot fluid inlet 14. The temperature of the blended fluid then increases and the thermally responsive element 28, following the temperature of the mixed fluid, turns the distributor disk 52 counterclockwise until it closes the channels 34 and 38 in the neutral position (FIG. 7). The adjustment is, thus, finished. In the same manner, when the pressure or temperature of the cold fluid changes, the adjustment is effected by the distributor disk 52.

According to the above, during each cycle of adjusting, a part of the fluid which is contained in one of the chambers 58 or 60, is pushed outside of the valve body 12. The pressure of incoming fluid in one of the inlets 14 or 16 is used as a power source for the process of adjustment.

The control channels 36 and 40 are thin enough, so that the sliding piston valve 24 moves much slower than the thermally responsive element 28 can react.

The angle of twisting of the thermally responsive element 28 is affected only by the temperature of the blended fluid in the chamber 30. Advantageously, there is no dependence on the pressures of the incoming fluids and their respective temperatures.

The channels 36 and 40 open into corresponding chambers 58 and 60 so that any air, which was dissolved in the fluids and released in the chambers 58 and 60 or that remains in the chambers 58 and 60 after the initial installation, is pumped away after the first few strokes of the sliding piston valve 24.

If the pressure in the cold fluid inlet 16 fails scalding or other undesirable consequences can occur, because the hot fluid may be excessive in the mixture. Alternately, the means for delivery of the fluids through the inlets can be employed. The hot fluid pressure can be used advantageously as a source of controlling pressure in the present invention. Closure of the valve occurs if the pressure of the cold fluid fails.

Figure 3:
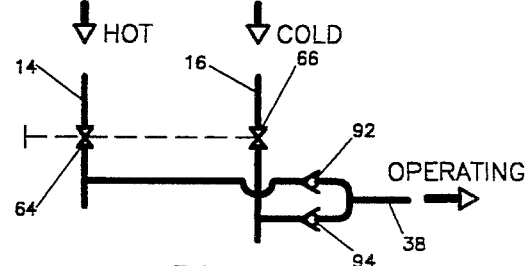
FIG. 3 is a schematic diagram showing an alternate embodiment for connecting both inlets to the channel for providing operational pressure.

Referring now to FIG. 3, there is shown an alternate means for controlling the input. Special additional valves 92, 94 can be used which will switch the input control channel 38 to that inlet in which pressure is higher.

Figure 2:
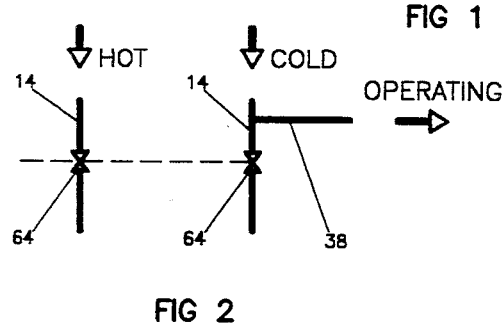
FIG. 2 is a schematic diagram showing an alternate embodiment for connecting the channel, where the operating pressure is provided before the valve, thereby controlling the fluid flow.
Figure 4:
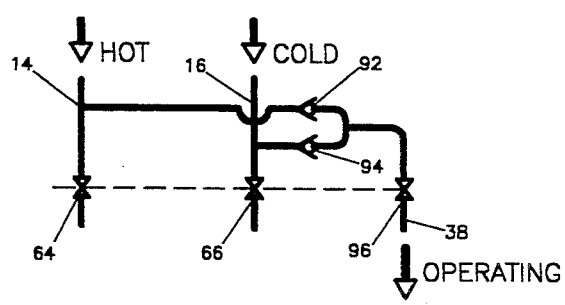
FIG. 4 is a schematic diagram showing an alternate embodiment for connecting both inlets.

As shown in FIGS. 2 and 4, it is envisioned that the channel(s) providing the operating fluid can be placed in the flow ahead of the valve(s) 64, 64 that adjust the fluid flow. The additional valves 92, 94 can also be placed ahead of the valves 62 and 64. The additional valves 92, 94 can operate by the same handle as the flow adjusting valves (64, 66 not shown). The additional valves 92, 94 close the channel(s) when the flow adjusting valves 92, 94 are closed, and open the channel(s) entirely before the flow adjusting valves 64, 66 are opened.

Additionally, referring again to FIG. 4, the input control channel 38 alternately can have a supplemental valve 96 for closing the input control channel 38, when the valves 64, 66 controlling the fluid flow are closed. Closing the supplemental valve 96 prevents fluid from entering the distributor 26 when no fluid is entering the sliding piston valve 24.

The used operating fluid can be disposed into the outlet with the mixed fluids.

Because the fluid flow control valves 64 and 66 can shut both fluids off from the thermostatic mixing valve, all the internal parts of the valve can be assembled without accurate precision. Thereby, the distributor 26 and the sliding piston valve 24 can compensate for any small leakage. The advantage of such a solution is that it will provide maximum pressure, which is not reduced by the flow adjusting valves 64, 66.

Although not shown in the drawings, the thermostatic mixing valve of the present invention is intended to replace an existing faucet and can be readily installed by threadably attaching the fluid inlets to the fluid delivery pipelines.

While the invention has been illustrated and described in the detail in the drawings and the foregoing description, the same to be considered as illustrative and not restrictive in character, it being understood that only the preferred embodiment has been shown and described and that all changes and modifications that come within the spirit of the invention are desired to be protected.

Having thus described the invention, what is claimed is:

1. A thermostatic mixing valve for blending hot and cold fluids, employing degenerative feedback and utilizing pressure in the fluids as a power source comprising:
   a valve body having a fluid mixing chamber for mixing the hot fluid with the cold fluid;
   a hot fluid inlet for conveying hot fluid to the valve body;
   a cold fluid inlet for conveying cold fluid to the valve body;
   a fluid outlet from the valve body for the mixed fluid;
   a thermally responsive element disposed in the valve body;
   means for distributing the hot fluid and the cold fluid, the means being rotatably positionable to alter fluid flow into the valve body, the means for distributing being rotatably positioned by the thermally responsive element;
   a drive operated by the pressure of the fluid, directed by the means for distributing for controlling the hot and cold fluid in a constant ratio of the not and cold fluid;
   means for connecting the means for distributing with one of the fluid inlets to provide operating pressure of the incoming fluid;
   means for connecting the means for distributing with the outside of the valve body to remove the mixed fluid; and
   means for connecting the means for distributing with the drive.

2. The valve of claim I wherein the thermally responsive element comprises:
   a bimetallic coil.

3. The valve of claim 1, further comprising:
   a valve for controlling flow of fluid in the hot fluid inlet and a valve for controlling flow of fluid in the cold fluid inlet.

4. The valve of claim 3 further comprising:
   means for interconnecting the valve controlling the flow of fluid in the hot fluid inlet with the valve controlling the flow of fluid in the cold fluid inlet for joint operation.

5. The valve of claim 4, further comprising:
   a valve to feed the distributor with incoming fluid from either fluid inlet in which the fluid pressure is higher.

6. The valve of claim 5, wherein used operating fluid is disposed with the flow of mixture of fluids to the outside of the valve body.

7. The valve of claim 6, in which means for connecting the means for distributing with the fluid inlets are hooked up before the valves, thereby controlling flows in the inlets.

8. The valve of claim 7, including a valve, which closes channels, connecting the distributor with the fluid inlets, when the valves controlling the fluid flows into the inlets are closed.

9. The valve of claim 8 further comprising:
a handle engaged with the thermally responsive element, the handle having a scale calibrated with degrees of temperature.

10. The thermostatic mixing valve of claim 1, wherein the means for distributing the hot fluid and the cold fluid comprises a circular disc having a plurality of passageways therein, the passageways being registerable with the drive, the cold fluid inlet and the outside of the valve body, depending on the position of the disc.

11. A thermostatic mixing valve for blending hot and cold fluids, employing degenerative feedback and utilizing pressure in the fluids as a power source comprising:
a valve body having a fluid mixing chamber for mixing the hot fluid with the cold fluid;
a hot fluid inlet for conveying hot fluid to the valve body, the hot fluid inlet including a valve for controlling flow of hot fluid;
a cold fluid inlet for conveying cold fluid to the valve body, the cold fluid inlet including a valve for controlling flow of cold fluid;
means for interconnecting the valve controlling the flow of fluid in the hot fluid inlet with the valve controlling the flow of fluid in the cold fluid inlet for joint operation;
a fluid outlet from the valve body for the mixed fluid;
a bimetallic element disposed in the valve body;
means for distributing the hot fluid and the cold fluid, controlled by the thermally responsive element;
a valve to feed the means for distributing incoming fluid from either fluid inlet in which the fluid pressure is higher;
a drive operated by the pressure of the fluid directed by the means for distributing for controlling the hot and cold fluid in a constant ratio of the hot and cold fluid;
means for connecting the means for distributing with one of the fluid inlets to provide operating pressure of the incoming fluid;
means for connecting the means for distributing with the outside of the valve body to remove the mixed fluid; and
means for connecting the means for distributing with the drive.

12. The valve of claim 11, wherein used operating fluid is disposed with the flow of mixture of fluids to the outside of the valve body.

13. The valve of claim 12, in which means for connecting the means for distributing with the fluid inlets are hooked up before the valves, thereby controlling flows in the inlets.

14. The valve of claim 13, including a valve, which closes channels, connecting the distributor with the fluid inlets, when the valves controlling the fluid flows into the inlets are closed.

15. The valve of claim 14, further comprising:
a handle engaged with the thermally responsive element, the handle having a scale calibrated with degrees of temperature.

16. A method for thermostatically mixing pressurized hot and cold fluids comprising:
conveying hot fluid and cold fluid into a valve body;
mixing hot and cold fluids in the valve body;
conveying the mixed hot and cold fluids from the valve body;
disposing a thermally responsive element in a chamber adapted to be in fluid communication with the mixed fluids;
distributing the flow with means for distributing;
rotatably positioning the means for distributing by the thermally responsive element;
driving a valve with pressure of the flow of fluid for controlling the hot and cold fluid flows;
connecting the means for distributing by a channel with one of the fluid inlets;
connecting the means for distributing with a channel to the outside of the valve body to remove the mixed fluid; and
connecting the means for distributing with a channel to the drive.

* * * * *